US005386225A

United States Patent [19]

Shibata

[11] Patent Number: 5,386,225

[45] Date of Patent: Jan. 31, 1995

[54] IMAGE RECORDING APPARATUS FOR ADJUSTING DENSITY OF AN IMAGE ON A RECORDING MEDIUM

[75] Inventor: Eiji Shibata, Nagoya, Japan

[73] Assignee: Brother Kogyo Kabushiki Kaisha, Nagoya, Japan

[21] Appl. No.: 815,039

[22] Filed: Dec. 31, 1991

[30] Foreign Application Priority Data

Jan. 24, 1991 [JP] Japan .................................. 3-007087

[51] Int. Cl.⁶ .............................................. G01D 15/16

[52] U.S. Cl. ........................................ 347/55; 355/259

[58] Field of Search ................ 355/246, 259; 346/159, 346/155, 153.1, 140 R; 118/654; 347/55

[56] References Cited

U.S. PATENT DOCUMENTS

| | | | |
|---|---|---|---|
| 3,636,924 | 1/1972 | Weiler | 118/654 X |
| 3,639,050 | 2/1972 | Staller | 118/654 X |
| 3,659,556 | 5/1972 | Mutschler | 118/654 X |
| 3,689,935 | 9/1972 | Pressman et al. | 346/159 |
| 3,870,017 | 3/1975 | Kratcoski et al. | 118/654 X |
| 3,967,549 | 7/1976 | Thompson et al. | 346/159 |
| 4,266,503 | 5/1981 | Uehara et al. | 118/657 |
| 4,373,798 | 2/1983 | Tsukada et al. | 355/259 |
| 4,491,855 | 1/1985 | Fujii et al. | 346/159 |
| 4,498,090 | 2/1985 | Honda et al. | 346/159 |
| 4,511,239 | 4/1985 | Kanbe et al. | 355/246 |
| 4,537,495 | 8/1985 | Kopko | 355/259 |
| 4,860,063 | 8/1989 | Okamoto | 355/208 |
| 4,876,573 | 10/1989 | Kamimura | 355/250 |
| 5,099,271 | 3/1992 | Maeda et al. | 355/27 |

*Primary Examiner*—Benjamin R. Fuller
*Assistant Examiner*—Randy W. Gibson
*Attorney, Agent, or Firm*—Oliff & Berridge

[57] ABSTRACT

An image recording apparatus charges toner particles and forms a suspension of the charged toner particles. The image recording apparatus generates an electric field between a control electrode which has apertures and a back electrode, to directly control a flow of the charged toner particles, and to record an image on an image recording medium which passes between both electrodes. The image recording apparatus has an adjusting unit which adjusts the density of the suspension of the charged toner particles. The adjusting unit adjusts the density of the suspension of the charged particles in accordance with a signal output from a manual adjusting member, when a user operates the manual adjusting member. Density of the image on the image recording medium is adjusted on the basis of operation of the adjusting unit. The particles can be supplied by a speed variable ciliary member or a vibrating belt.

24 Claims, 5 Drawing Sheets

Fig.4

| DENSITY | ROTATION |
|---|---|
| 1 | R1 |
| 2 | R2 |
| 3 | R3 |
| 4 | R4 |
| 5 | R5 |

IMAGE RECORDING APPARATUS FOR ADJUSTING DENSITY OF AN IMAGE ON A RECORDING MEDIUM

BACKGROUND OF THE INVENTION

1. Field of the Invention

The present invention relates to an image recording apparatus which is employed in a copy machine, a plotter, a printer and a facsimile machine and more particularly to an image recording apparatus which directly controls a flow of toner particles and records an image on a recording medium.

2. Description of Related Art

There has been proposed, for example, an image recording apparatus disclosed in U. S. Pat. No. 3,689,935. The image recording apparatus charges toner particles and forms a suspension of the charged toner particles. The image recording apparatus generates an electric field between a control electrode having apertures through which the charged toner particles can pass and a back electrode, and records an image on a support member inserted between both the electrodes, by directly controlling the charged toner particles.

However, in the above mentioned image recording apparatus, the density of the suspension of the toner particles is controlled such that the density is constant when the image is being recorded.

SUMMARY OF THE INVENTION

It is an object of the present invention to provide an image recording apparatus capable of obtaining an output image having desired density on a recording medium.

Another object of the present invention to provide an image recording apparatus capable of forming an image having desired density on a recording medium by adjusting the density of the suspension of the charged particles.

In order to attain the above objects, an image recording apparatus according to this invention comprises:

- a carrying unit for carrying charged particles, the carrying unit forming a suspension of the charged particles;
- a control electrode unit having at least one row of apertures through which the charged particles carried by the carrying unit pass;
- a back electrode unit confronting the carrying unit through the control electrode unit, the back electrode unit being spaced from the control electrode by a space enabling passage of a support medium on which an image is recorded; and
- an adjusting unit for adjusting the density of the suspension of the charged particles which have not reached the apertures.

According to the image recording apparatus of the present invention thus constructed, the adjusting unit adjusts the density of the suspension of the charged particles which have not reached the apertures. Therefore, it becomes possible to obtain an output image having a desired density by this image recording apparatus.

BRIEF DESCRIPTION OF THE DRAWINGS

The above and other objects, features and advantages of the invention will become more apparent from reading the following description of the preferred embodiments taken in connection with the accompanying drawings in which:

FIG. 4 is a table showing the relationship between the density of an output image on a recording medium and the rotational speed of the rotating roller.

DETAILED DESCRIPTION OF THE PREFERRED EMBODIMENTS

Referring now to the accompanying drawings, preferred embodiments of the invention will be described in detail.

Figure 1:
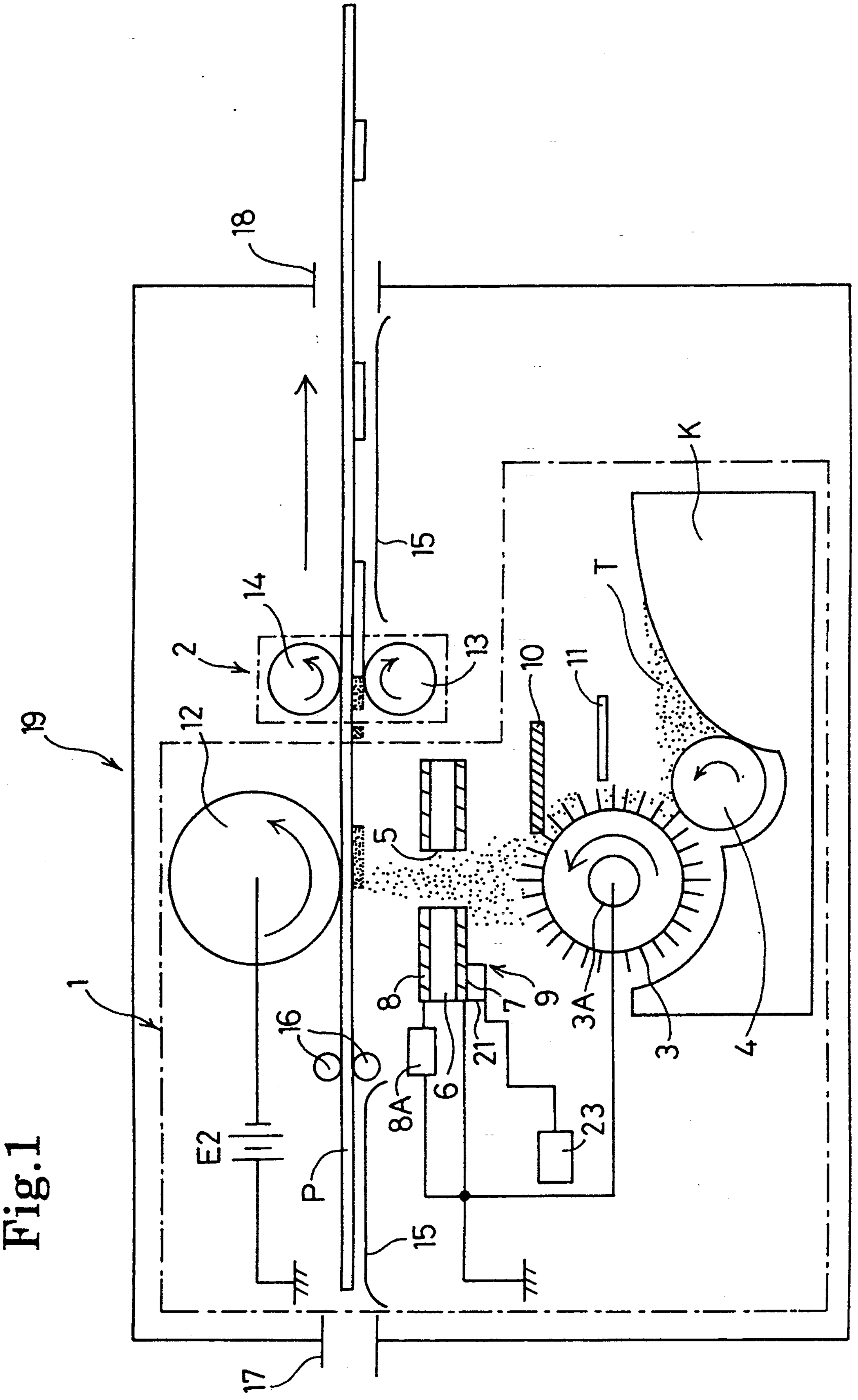
FIG. 1 shows a construction of a first embodiment of an image recording apparatus which embodies the invention.

As shown in FIG. 1, an image recording apparatus 19 is roughly divided into an image recording portion 1 and a thermal fixing portion 2. On the side of this image recording apparatus 19, a sheet inlet 17 for inserting a recording medium P on which an image will be recorded and a sheet outlet 18 for discharging the recording medium P having the image recorded thereon are installed. A sheet passage for feeding the recording medium P is formed between the sheet inlet 17 and the sheet outlet 18 in the image recording apparatus 19.

The main part of the image recording portion 1 includes a rotatable brush roller 3 which functions as a ciliary member, a particle control member 9 which functions as control electrode means or controlling means, and an electrode roller 12 which functions as a back electrode means or an attracting means. The brush roller 3 has a roller shaft 3A to rotate the roller 3. The roller shaft 3A is coupled with a motor 3C (FIG. 3) through a driver 3B and a conventional drive gear train (not shown). The brush roller 3 is spaced from the path of the recording medium P.

Around the brush roller 3, a supply roller 4, a brush blade member 11, and a deflection member 10 are arranged along the rotating direction of the brush roller 3. The supply roller 4 and the deflection member 10 are arranged to contact the brush roller 3. The brush blade member 11 is installed close to the tips of the bristles of the brush roller 3. The supply roller 4 is installed in a toner case K in which toner particles T are stored. The supply roller 4 triboelectrically charges the toner particles T as the roller rotates counterclockwise as shown in FIG. 1. The charged toner particles T adhere to the surface of the supply roller 4. The supply roller 4 supplies the charged toner particles T to the brush roller 3 by rotating counterclockwise.

The blade member 11 removes excess toner particles T from the brush roller 3 which have been supplied to the brush roller 3 and makes the layer thickness of the toner particles T constant and smoothes the surface of the layer of the toner particles T. The deflection member 10 deflects the bristles of the brush roller 3. The deflection member 10 and the brush roller 3 supply the toner particles T supported and carried by the brush roller 3 to the particle control member 9, which is installed above the brush roller 3. The deflection member 10 and the bristles of the brush roller 3 function as a carrying means or supplying means to form a suspension of toner particles. Further, the brush roller 3 is grounded.

Figure 2:
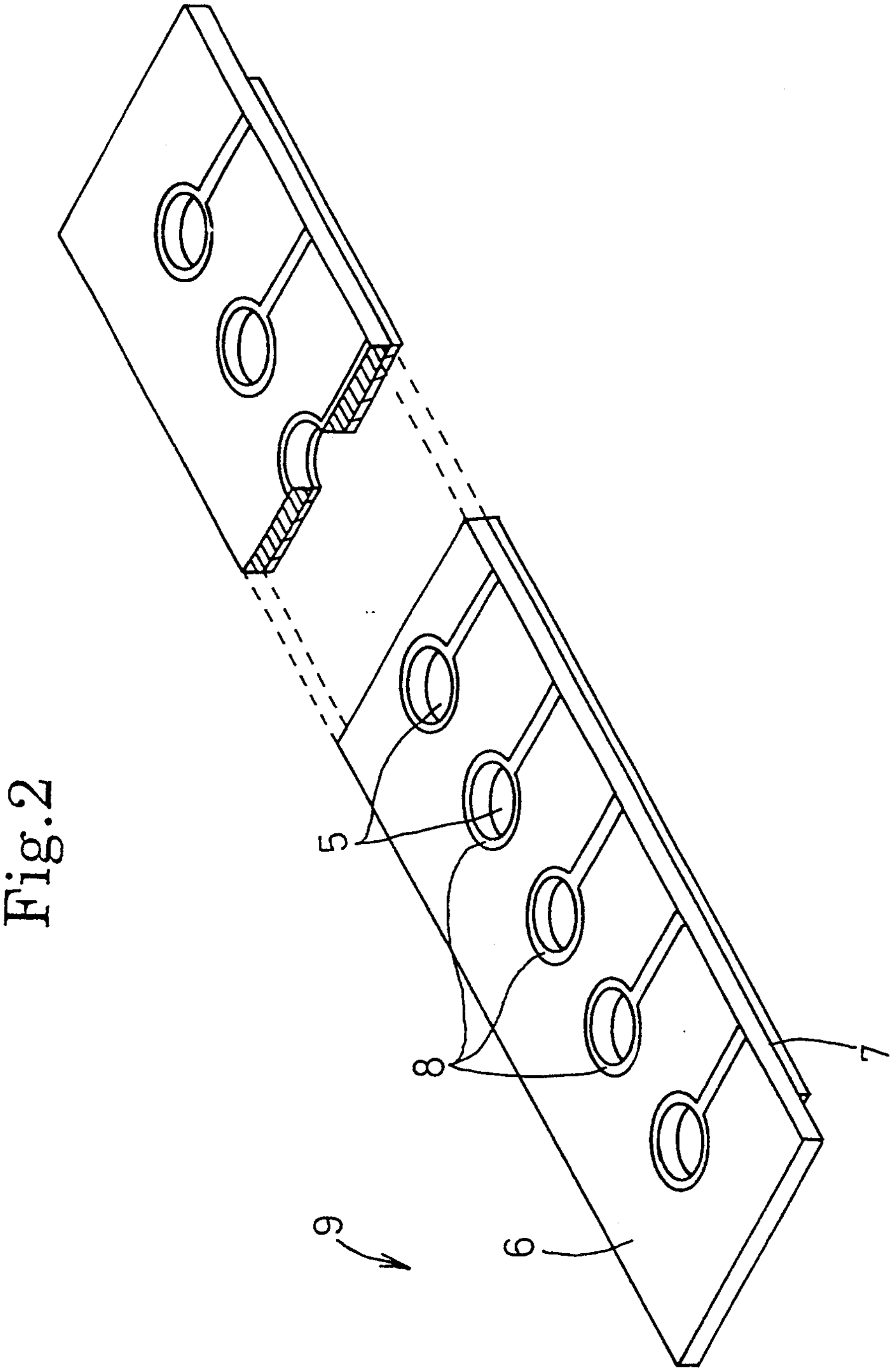
FIG. 2 is a perspective view showing the particle control member with the reference electrode facing up.

The construction of the particle control member 9 will be explained with reference to FIG. 2. FIG. 2 is a perspective view showing the particle control member 9 with the reference electrode 7 facing up.

The particle control member 9 comprises a plurality of apertures 5, an insulative layer 6, a reference electrode 7, and a plurality of segment control electrodes 8. The control member 9 is disclosed in U.S. Pat. No. 3,689,935, the disclosure of which is herein incorporated by reference. The insulative layer 6 is a thin board which comprises an insulating material. Any material can be used as an insulating material if the material has an insulating characteristic. It is thus possible to use films such as a resin, ceramic, and PET (polyethylene terephthalate) film. The reference electrode 7, which is installed on the insulative layer 6, faces the brush roller 3, and is a metallic layer connected to the negative side of a direct current power supply E1. The plurality of apertures 5 penetrate the insulative layer 6, the reference electrode 7 and the control electrodes 8. Moreover, the plurality of apertures 5 are arranged in one line perpendicular to the feeding direction of the recording medium P. In addition, the segment control electrode 8 is a metallic layer disposed independently around each aperture 5 and on a side of insulative layer 6 opposite the side where the reference electrode 7 is disposed. The plurality of segment control electrodes 8 are connected independently to image signal leads (not shown) from a driver 8A (FIG. 3), which correspond to the number of the segment control electrodes 8.

Further, a vibration applying unit is arranged on the surface of the reference electrode 7. The vibration applying unit comprises a piezoelectric member 21 (FIG. 1) which is supplied with an A.C. current from an A.C. power source 23 (FIG. 3) through a vibration driver 24. The A.C. power source 23 can supply an A.C. current at a predetermined frequency corresponding to a vibration frequency of the piezoelectric member 21. The vibration driver 24 supplies A.C. current to the member 21 while a printing operation is performed. Piezoelectric ceramic materials, such as zirconic acid lead titanate (PZT), are used for the piezoelectric member 21. Polymeric piezoelectric materials, such as polyvinylidene fluoride, etc. can also be used. A plurality of piezoelectric members 21 may be arranged on a surface of the reference electrode 7 in order to appropriately vibrate the particle control member 9.

An electrode roller 12 is disposed facing the brush roller 3 through the particle control member 9. There is a space between the electrode roller 12 and the particle control member 9. A pair of the feeding rollers 16 and the guide 15 are arranged along the passage of the recording medium P so that the recording medium P inserted from the sheet inlet 17 is fed by and passes through the passage. This electrode roller 12 is connected to the negative side of direct current power supply E2. The toner particles T which have passed through the apertures 5 of the particle control member 9 are attracted to the electrode roller 12 by this applied voltage. The toner particles T attracted to the electrode roller 12 adhere to the recording medium P which passes between the particle control member 9 and the electrode roller 12.

The thermal fixing portion 2 comprises a heat roller 13 including a heater 13C (FIG. 3) and a press roller 14. The heat roller 13 and the press roller 14 are arranged such that the recording medium P on which the toner particles T adhere can pass between both rollers. The toner particles T are melted by heat from the heat roller 13, and the melted toner particles T are bonded firmly to the recording medium P by the pressure from the heat roller 13 and the press roller 14.

Figure 3:
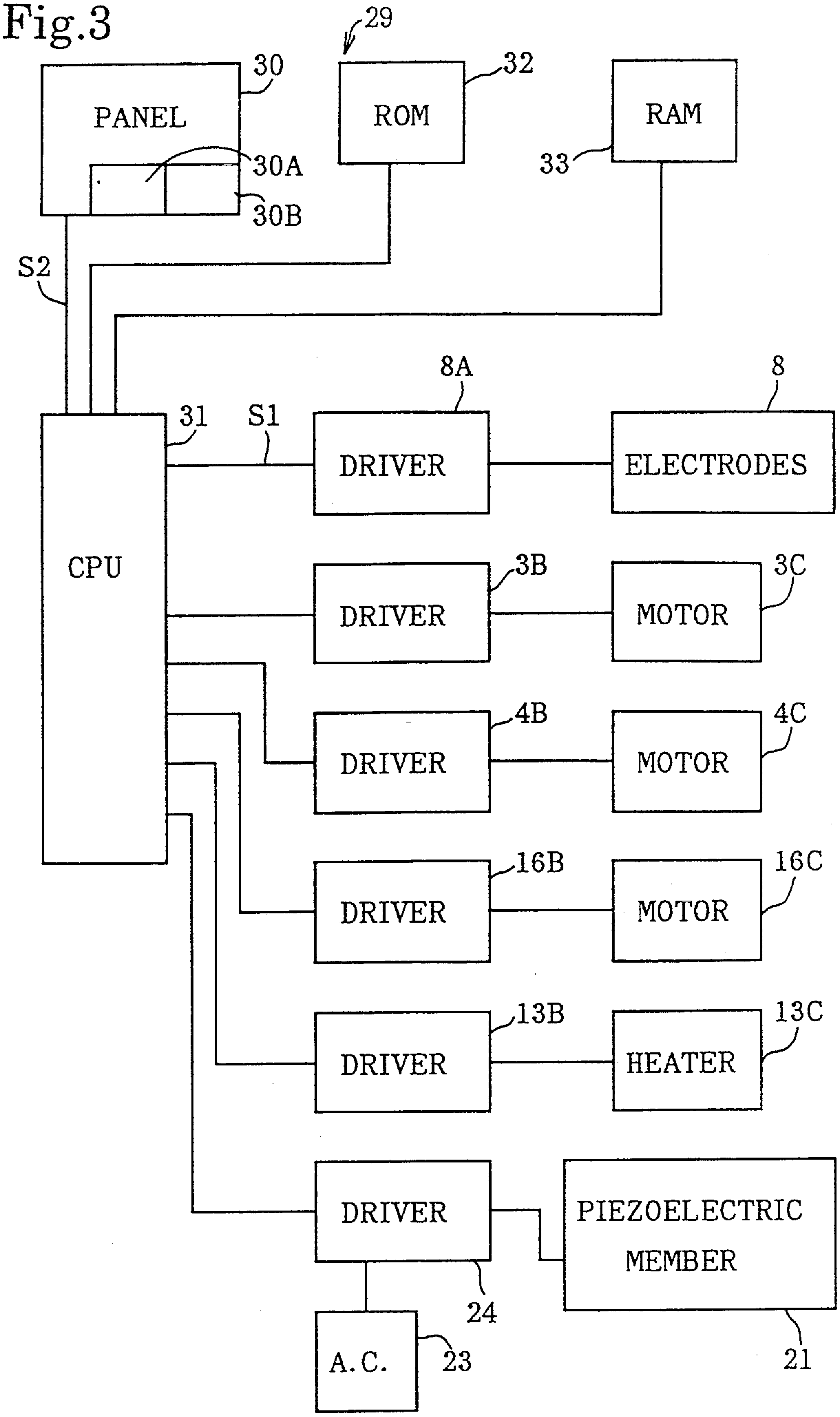
FIG. 3 is a block diagram of the first embodiment of an image recording apparatus.

An electrical control circuit incorporated in this embodiment will be explained with reference to FIG. 3. The control circuit 29 essentially comprises a central processing unit (hereinafter called CPU) 31, a read-only memory (hereinafter called ROM) 32 and a random access memory (hereinafter called RAM) 33 which are connected by an electrical bus (not shown).

A panel 30 is connected to the CPU 31 and the panel 30 has a density increasing key 30A, to increase the density of the output image on the recording medium P, and a density decreasing key 30B, to decrease density of the output image on the recording medium P, which function as a manual input member. The segment control electrodes 8 of the control member 9 are connected to the CPU 31 through a driver 8A. A motor 3C for rotating the brush roller 3 counterclockwise is connected to the CPU 31 through a driver 3B so that the motor 3C for the brush roller 3 is rotated at determined speed described below. A motor 4C for rotating the supply roller 4 is connected to the CPU 31 through a driver 4B and a conventional gear train (not shown) so that the supply roller 4 rotated by the motor 4C transports the toner particles T to the rotating brush roller 3. A motor 16C, for rotating the feeding rollers 16, the press roller 14, the heat roller 13 and the electrode roller 12, is connected to the CPU 31 through a driver 16B and a conventional mechanical transmission system (not shown) so as to feed the recording medium P from the sheet inlet 17 to the sheet outlet 18 along the feed path. The heater 13C is connected to the CPU 31 through the driver 13B so that the heater 13 heats the recording medium P at a determined temperature to fix the toner particles T on the recording medium P.

The ROM 32 stores a data converting table as shown in FIG. 4 for converting density data into rotational speed data to determine the rotating speed of the brush roller 3. The panel 30 outputs a density data signal S2 to the CPU 31 in accordance with the user's operation on the basis of the setting of the desired density level by keys 30A and 30B. The CPU 31 recognizes the density data signal S2 which corresponds to the density data. The conversion table correlates a particular density of the image with a particular rotating speed of brush 3. In the table, density level 1 corresponds to a light image on a recording medium P and density level 5 corresponds to a dark image thereon. When a user operates the density increasing key 30A or the density decreasing key 30B the desired density of the image is determined. For example, density level 3 has a corresponding rotating speed R3. The rotating speed corresponding to the selected density level can be determined experimentally and input to the conversion table of FIG. 4. The higher the density data signal S2 output from the panel 30, the faster the brush roller 3 rotates counterclockwise. Therefore the motor 3C, the driver 3B, the roller shaft 3A, the keys 30A, 30B, the converting table as shown in FIG. 4 and the CPU 31 function as an adjusting means for adjusting the density of the recorded image.

The RAM 33 stores a plurality of image data which is applied to the control electrodes 8 to control the formation of an image on the recording medium P. The CPU 31 outputs image signal S1 corresponding to the image data to the segment control electrodes 8 through the driver 8A. The segment control electrodes 8 receive the image signal S1 and if the signal indicates that the image is to be formed on the recording medium P, allow the toner particles T to pass through the aperture 5. The segment control electrodes 8 which do not receive an image signal S1 do not allow the toner particles T through the aperture 5.

Next, the operation of the image recording apparatus 19 of this embodiment will be described with reference to FIGS. 1-4. At first, the user operates the density increasing key 30A or the density decreasing key 30B and determines the density of the image thereon which is desired. The panel 30 outputs density data signal S2 to the CPU 31 in accordance with user operation. The CPU 31 recognizes the density data signal S2 which corresponds to the density data and converts the density level to a corresponding rotating speed of the motor 3C.

The recording medium P inserted through the sheet inlet 17 is supported by the guide 15 and is fed into the image recording portion 1 by a pair of the rotatable feeding rollers 16. When the recording medium P is fed into the image recording portion 1, the supply roller 4 rotates counterclockwise.

When supply roller 4 rotates counterclockwise, the toner particles T are triboelectrically charged, for example in a positive polarity, between the supply roller 4 and the toner case K. The positively changed toner particles T are supported on the surface of the supply roller 4 and are fed to come in contact with the bristles of the brush roller 3. At this time, the toner particles T are further triboelectrically charged by contacting the rotating brush roller 3. Thus, the positive charge on the toner particles T is increased.

The positively charged toner particles T move from the surface of the supply roller 4 to the brush of the brush roller 3. The brush blade 11 is installed close to the tips of the bristles of the brush roller 3. Therefore, excess toner particles T supplied to the brush roller 3 are removed by the brush blade 11. As a result, a layer of toner particles having a uniform thickness and a smooth surface is formed on the surface of the brush roller 3.

Next, below the particle control member 9, the deflection member 10 deflects the bristles of brush roller 3, which support the toner particles T. When the brush roller 3 rotates counterclockwise, the bristles come contact with the deflection member 10 and bend elastically, since the deflection member 10 is positioned to come in contact with the bristles of the brush roller 3. When the brush roller 3 rotates further counterclockwise, the bristle bend further and then move away from the deflection member 10. The bristles then return to the original unbent position elastically. At this moment, the toner particles T, which are supported on the bristles, separate from the bristles. As a result, the toner particles T thus separated from the brush roller 3 form a suspension of toner particles T below the particle control member 9. As the rotational speed of the brush roller 3 increases, a greater number of toner particles are supplied by the brush roller 3 per unit time and a greater number of toner particles T separate from the brush roller 3, since the toner particles T have an energy for separation in proportion to the rotational speed of the brush roller 3. Therefore the higher the rotational speed of brush roller 3, the higher the density of the suspension of the toner particles T.

The suspension of the positively charged toner particles T is attracted to the reference electrode 7. The CPU 31 outputs a plurality of image data to the control electrodes 8 from the RAM 33. The flow of the toner particles T is directly modulated by the image signal S1 (the image signal S1 consists of a positive voltage and 0 voltage) applied on the basis of image signal S1 to the segment control electrode 8 of the particle control member 9. Therefore, if a positive voltage is applied to the segment control electrode 8 of one of the aperture 5 on the basis of the image signal S1, the toner particles T cannot pass through the aperture 5, since the toner particles T are positively charged. The toner particles T can pass through the aperture 5 when 0 voltage is applied to the segment control electrode 8 of the aperture 5 on the basis of the image signal S1.

When the density of the suspension of toner particles T supplied below the particle control member 9 becomes high, the amount of the toner particles T which can pass through the aperture 5 in a predetermined unit of time becomes high. Therefore the amount of the toner particles T which can pass through the aperture 5 becomes high and the density of the image becomes high.

When the suspension of toner particles T is formed below the particle control member 9, current is supplied from the power supply 23 to the piezoelectric member 21 mounted on a surface of the reference electrode 7. The piezoelectric member 21 is induced to vibrate by the current supplied from the power supply 23 to the piezoelectric member 21. The vibration is transmitted to the reference electrode 7 and generates a surface wave on the reference electrode 7. The appropriate frequency of vibration is dependent upon the construction (i.e., shape, material, etc.) of the particle control member 9 and the voltage applied to the particle control member 9. Thus, as a result of the vibration to the particle control member 9, even if the toner particles are attracted to the reference electrode 7, the toner particles T do not adhere to the reference electrode 7.

The toner particles T supplied in the form of a suspension are modulated with the segment control electrode 8 of the particle control member 9 on the basis of the image signal S1 received from the CPU 31. The toner particles T which pass through the particle control member 9 are positively charged. As a result, the toner particles T are attracted toward the electrode roller 12. The toner particles T adhere to the recording medium P, which has been fed by the guide 15 and the pair of feeding rollers 16 P to the space between the particle control member 9 and the electrode roller 12. The toner particles T which adhere to the recording medium P by passing through each aperture 5 construct each dot of the recorded image.

Afterwards, the recording medium P on which the toner particles T adhere is fed to the thermal fixing portion 2. The recording medium P on which the toner particles T adhere is pressed by the heat roller 13 and the press roller 14 in the thermal fixing portion 2. At this time, the toner particles T on the recording medium P melt and are fixed by heat from the heater 13C in the heat roller 13. A detailed explanation of the thermal fixation will be omitted because it is generally well known. Finally, the recording medium P on which the image is fixed a portion of which is supported by the guide 15 and the pair of rotatable feeding rollers 16, is fed to the sheet outlet 18, and is discharged from the image recording apparatus 19.

Figure 5:
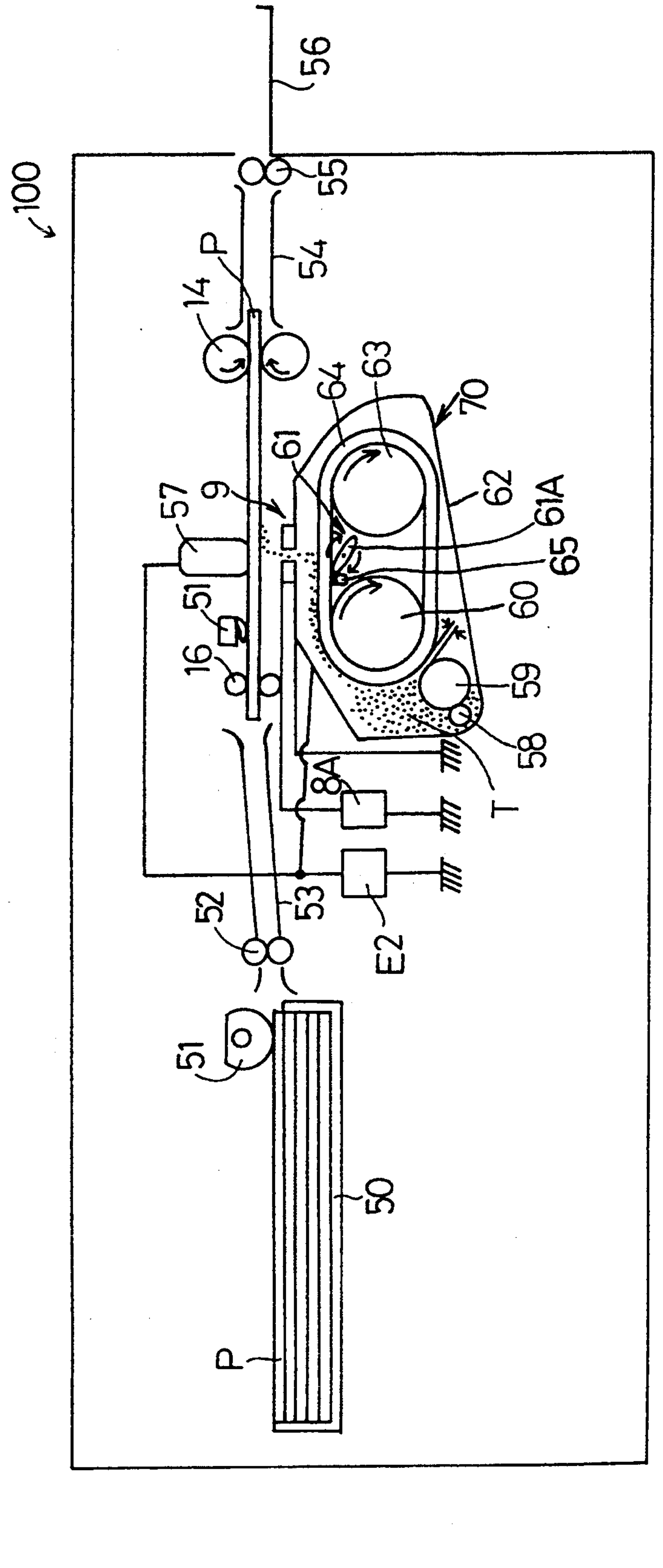
FIG. 5 shows a construction of a second embodiment of an image recording apparatus which embodies the invention.

Next the second embodiment will be described with reference to FIG. 5.

The main difference between the first embodiment and the second embodiment is the toner particle carrying mechanism 70 for carrying charged toner particles and forming a suspension of the charged toner particles. Therefore common elements between the first embodiment and the second embodiment are designated with the same reference numerals and the detailed explanation relating to the common elements will be omitted.

This recording apparatus 100 has a sheet cassette 50 for holding a plurality of sheets of recording media P and a feed roller 66 for separating one of the sheets of recording medium P from the stack of sheets of recording media P and for feeding a sheet of recording medium P rightward from the cassette 50. The sheet guides 53, 54 are formed in the recording apparatus 100 and three pairs of feed rollers 52, 16, 55 and a pair of heat rollers 14 are arranged along the sheet guides 53, 54. A sensor 51 for detecting the recording medium P is disposed between the heat roller 14 and the roller 16 in the apparatus 100 and a sheet tray 56 is disposed outside the apparatus 100. An electrode 57 for attracting the toner particle T is disposed between the heat roller 14 and the sensor 51 in the apparatus 100. The electrode 57 is connected to a direct current supply E2.

The particle control member 9 has apertures 5, insulative layer 6, reference electrode 7, and segment control electrodes 8 as shown in FIG. 2. The segment control electrodes 8 are connected to a driver 8A and the reference electrode 7 is grounded.

A toner particle carrying mechanism 70 is disposed below the particle control member 9 and has a toner case 62 for supplying toner particles T. In the toner case 62, a supply roller 58 and a brush roller 59 are arranged so that the supply roller 58 and the brush roller 59 touch each other. The supply roller 58 is formed of a metal shaft and a sponge member attached to a surface of the metal shaft. The brush roller 59 is formed of a metal shaft and nylon bristles attached to a surface of the metal shaft. When the supply roller 58 is rotated, the toner particles T are supported on the supply roller 58. When the supply roller 58 is further rotated, the toner particles T supported on the supply roller 58 are triboelectrically charged by contacting the brush roller 59, which is rotated. In this case, the toner particles T are positively charged by the frictional contact occurring between the particles and the rollers 58 and 59. A rotatable roller 60, which is confronted with the brush roller 59 through a clearance and a belt 64 described below, is connected to a negative pole of direct current supply (not shown) in order to form electric field between the rotatable roller 60 and the brush roller 59.

Therefore, the charged toner particles T are attracted to the belt 64 because of electrostatic force between the rotatable roller 60 and the brush roller 59. In this case, the belt 64 is formed of polyimide. And the clearance is between the belt 64 and the brush roller 59 is in the range of about 0.1 millimeter to about 0.4 millimeters.

The toner particle carrying mechanism 70 has a pair of rotatable rollers 63, 60 separated each other in the case 62. A belt 64 for supporting charged particles T thereon, is provided around the pair of rollers 63, 60 and a vibrating unit 61 for vibrating the belt 64 so as to separate the charged particles T therefrom is arranged below the belt 64 in the toner case 62. The vibrating unit 61 comprises a rotatable cam 61A for contacting and vibrating the belt 64 and a rotating unit (not shown) for rotating the cam 61A. An erasing roller 65 for erasing any frictional charge on the belt 64 is arranged below the belt 64.

When the cam 61A rotates, the belt 64 which supports the toner particles T vibrates up and down. The frequency of vibration of the belt is directly related to the speed of rotation of cam 61A. That is, the higher the rotational sped of cam 61A, the more the belt 64 vibrates. The higher the belt 64 vibration, the more toner particles T separate from the belt 64, since the toner particles T have an energy of separation in proportional to speed, frequency and magnitude of the vibration of the belt 64. Therefore the higher the speed of rotation of cam 61A, the higher the density of the suspension of the toner particles T.

When density of the suspension of toner particles T supplied below the particle control member 9 becomes high, the amount of the toner particles T which can pass through the aperture 5 becomes high. Therefore the amount of the toner particles T which can pass through the aperture 5 becomes high, the density of the image becomes high.

In another embodiment, a piezoelectric member may be used in place of the rotating cam vibrator unit in the second embodiment.

It is to be understood that the present invention is not limited to the above described embodiments, and various modifications and alterations can be added there to without departing from the scope of the inventions encompassed by the appended claims. In order to adjust the density of the image on the recording medium, various adjusting units for adjusting the density of the suspension of the toner particles below the particle control member can be employed.

What is claimed is:

1. An image recording apparatus comprising:

a carrying means for carrying charged particles, said carrying means including means for forming a suspension the charged particles;

control electrode means having at least one row apertures through which the charged particles carried by said carrying means can pass;

back electrode means facing said carrying means through said control electrode means, said back electrode means being spaced from the control electrode means by a space enabling passage of a support medium on which an image is recorded; and adjusting means for controlling the carrying means to adjust the density of the suspension of the charged particles formed by the carrying means, whereby the density of the image recorded on the support medium is varied.

2. The image recording apparatus according to claim 1, wherein said carrying means comprises a rotatable roller means.

3. The image recording apparatus according to claim 2, wherein said roller means comprises a ciliary member for carrying the charged particles.

4. The image recording apparatus according to claim 3, wherein said carrying means comprises a deflection member for deflecting the ciliary member, and wherein the ciliary member and the deflection member form the suspension of the charged particles.

5. The image recording apparatus according to claim 4, wherein said adjusting means comprises means for varying the rotational speed of said roller means.

6. The image recording apparatus according to claim 5, wherein the adjusting means includes means for setting the rotational speed of said roller means at one of a plurality of predetermined speeds.

7. The image recording apparatus according to claim 1, wherein said adjusting means includes means for varying the separating speed of charged particles separated from said carrying means.

8. The image recording apparatus according to claim 7, further comprising manual input means for controlling said adjusting means.

9. The image recording apparatus according to claim 1, wherein said control electrode means comprises:

an insulative layer;

a reference electrode on one surface of said insulative layer; and a plurality of segment control electrodes on a surface of said insulative layer opposite said one surface, each aperture passing through one of said segment control electrodes, said insulative layer and said reference electrode.

10. An image recording apparatus for recording an image on a support medium based on an image signal, the image recording apparatus comprising:

supplying means for forming and supplying a suspension of charged particles;

controlling means having a control member formed with an aperture, said controlling means for controlling passage of the charged particles through the aperture based on the image signal;

attracting means for attracting the charged particles which have passed through the aperture onto the support medium: and adjusting means for controlling the supplying means to adjust the density of the suspension of the charged particles formed by the supplying means, whereby the density of the image recorded on the support medium is varied.

11. The image recording apparatus according to claim 10, wherein said supplying means includes a pair of rotatable rollers separated each other, a belt provided around the pair of rollers for supporting charged particles thereon, and vibrating means for vibrating the belt to separate the charged particles therefrom.

12. The image recording apparatus according to claim 11, wherein said vibrating means is rotatable cam means for contacting and vibrating the belt.

13. The image recording apparatus according to claim 11, wherein said controlling means comprises:

an insulative layer;

a reference electrode on one surface of said insulative layer; and at least one segment control electrode on a surface of said insulative layer opposite said one surface, said aperture passing through said segment control electrode, said insulative layer and said reference electrode.

14. An image recording apparatus wherein a suspension of charged particles are applied onto a support medium based on an image signal to form an image on the support medium, the image recording apparatus comprising:

supplying means for supplying a quantity of particles from a particle supply to form the suspension;

controlling means having a control member formed with an aperture, the controlling means being responsive to image signal to control a flow of charged particles from said suspension of charged particles, which particles pass through the aperture and are transported onto the support medium; and adjusting means for controlling the supplying means to adjust density of the suspension of the charged particles which have not reached the aperture.

15. An image recording apparatus as in claim 14, wherein the adjusting means includes means for controlling the quantity of charged particles forming the suspension.

16. An image recording apparatus as in claim 14, wherein the adjusting means comprises a movable member for carrying particles and means for controlling the speed of the movable member.

17. An image recording apparatus as in claim 16, wherein the movable member is a rotatable ciliary body.

18. An image recording apparatus as in claim 17, and further comprising a deflecting member for causing the ciliary body to release the particles.

19. An image recording apparatus as in claim 16, wherein the movable member is a belt, and further comprising vibration means to vibrating the belt to cause the particles to form said suspension.

20. An image recording apparatus as in claim 19, wherein the adjusting means includes means for varying the frequency of the vibration means.

21. An image recording apparatus for recording an image based on an image signal, the image recording apparatus comprising:

a control electrode formed with apertures, said control electrode controlling passage of charged particles from a first side to a second side of the apertures based on the image signal;

a particle conveyer disposed on the first side of the apertures of said control electrode to supply charged particles to said control electrode;

a back electrode disposed on the second side of the apertures of said control electrode to attract charged particles which have passed through the apertures to the second side of the apertures;

a driver connected to said particle conveyer;

density control means for controlling a selected density of the recorded image; and driver control means connected to said driver and said density control means for controlling a driving speed of said driver based on the density set by said density control means.

22. An image recording apparatus according to claim 21, wherein said particle conveyer includes at least one roller.

23. An image recording apparatus according to claim 22, wherein said at least one roller includes a supply roller and a brush roller.

24. An image recording apparatus according to claim 21, wherein said particle conveyer includes a pair of rollers and a belt provided around said pair of roller.

* * * * *